Dec. 26, 1944.   E. F. ALLEN   2,365,927
VALVE DEVICE
Filed May 31, 1943
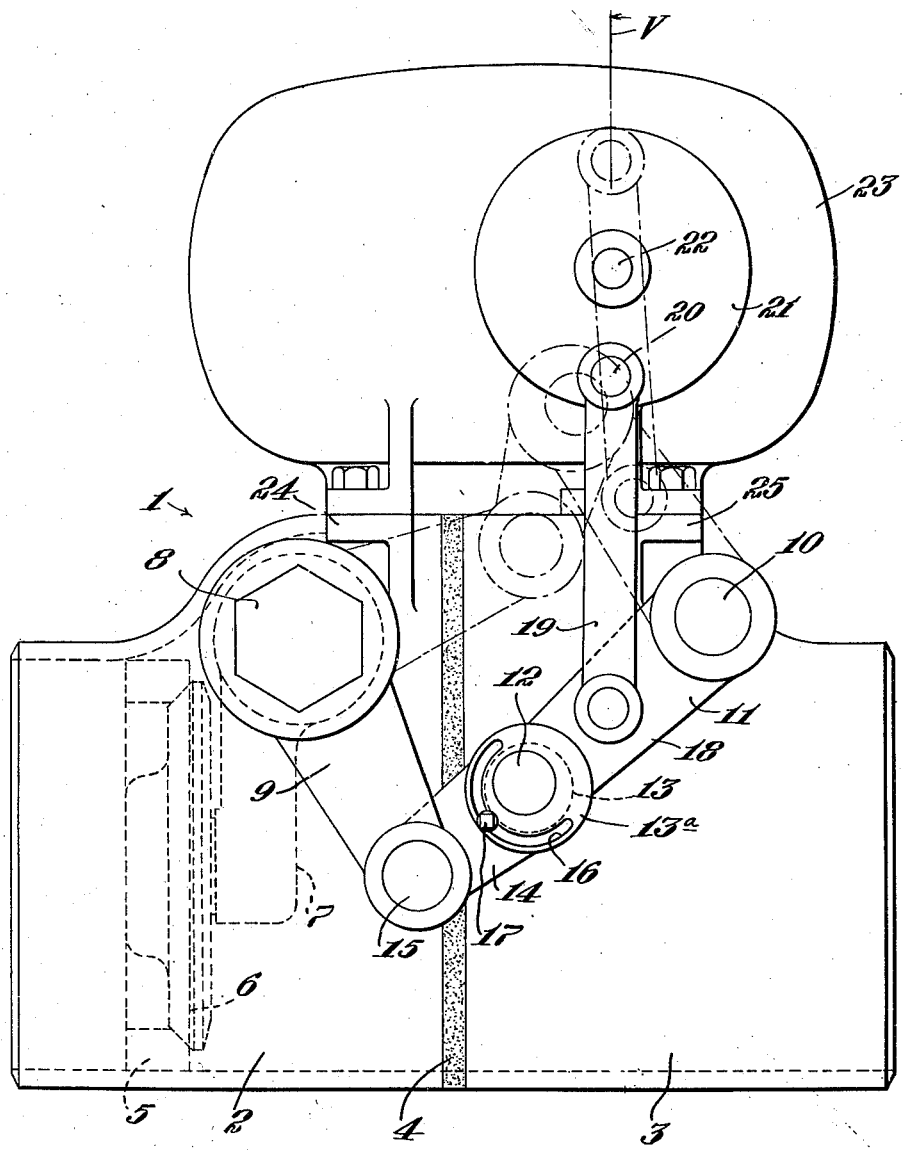
Inventor
Earle F. Allen
by Roberts Cushman & Woodberry
Attys.

Patented Dec. 26, 1944

2,365,927

UNITED STATES PATENT OFFICE 2,365,927

VALVE DEVICE

Earle F. Allen, Boston, Mass., assignor to Manning, Maxwell & Moore, Incorporated, New York, N. Y., a corporation of New Jersey Application May 31, 1943, Serial No. 489,127

2 Claims. (Cl. 251—10)

This invention pertains to valves for controlling the flow of fluid through conduits and relates more particularly to improved mechanism including link and lever connections for moving the valve head toward and from its seat and for automatically locking it in closed position. While in its broader aspects the invention herein disclosed is useful in manually actuated valves, it is primarily designed for use with motor-actuated valves. In the embodiment shown for illustration, the valve casing comprises standard sections of tubing united by welding, but it is to be understood that the specific actuating mechanism herein shown and claimed is useful with casings of other types.

Heretofore motor driven valve-actuating devices have customarily been complicated and expensive, usually employing a reversible motor or reverse gearing and have been subject to the difficulty that if the motor fails to stop at the proper instant, straining and even breaking of parts may result. One object of the present invention is to provide a motor driven valve-actuating drive of simple, inexpensive and durable type which does not require a reversible motor or complex reversing mechanism; which furnishes adequate closing force for seating the valve firmly; which locks the valve when closed; and whose parts will not be overstressed even if the motor fails to stop when the valve head arrives at either limit of its normal path of travel.

In lever actuated valves, wherein the operating element has a fixed range of movement it is sometimes difficult to insure accurate seating of the valve under all conditions, for example after the development of wear in the connections or at the seat surfaces. A further object of the present invention is to provide readily accessible means for accurately adjusting the position of the valve head relatively to the operating lever so as to insure proper seating of the valve head.

Other and further objects and advantages of the invention will be pointed out in the following more detailed description and by reference to the accompanying drawing wherein The drawing is a side elevation of the improved valve-actuating mechanism mounted upon a valve casing, which houses a seat and a valve head (shown in dotted lines).

Referring to the drawing, the numeral 1 designates a valve casing of a preferred construction, such casing, as here illustrated, comprising two standard reducer sections 2 and 3, respectively, of drawn steel or alloy tubing arranged with their larger ends in abutting relation and permanently united by welding metal at 4. While the casing as thus constructed is desirable, it is to be understood that the improved valve-actuating mechanism about to be described is equally applicable to valve casings of other types. As herein illustrated, the section 2 houses the annular valve seat 5 which may be of any desired material, preferably wear-resistant, and which is preferably welded in place. The valve head 6 cooperates with the seat 5 and is carried by an arm 7 which is rigidly secured to the valve stem or shaft 8 which is journaled to turn in suitable tubular bearings welded to the casing section 2. The shaft 8 extends to the outside of the casing and has secured to its outer end a rigid rock arm 9.

The other section 3 of the casing is provided with suitable tubular bearings welded or otherwise secured to the casing section and in which turns a shaft 10 whose axis is here shown as parallel with and in the same horizontal plane as the axis of the valve stem or shaft 8. The horizontal plane of these axes is shown as approximately that of the topmost longitudinal element of the smaller ends of the sections 2 and 3—the valve stem 8 extending transversely across the upper, eccentric portion of the valve chamber.

A lever 11 is fixed to the shaft 10 and is provided at its free extremity with a pin 12 which turns in an eccentric opening in a bushing 13 which is journaled in an opening in one end of a link 14 whose other end has a bearing for the reception of a pin 15 projecting from the free end of the rock arm 9. The bushing 13 is provided with a disk-like portion 13ª having an arcuate slot 16 which receives a retaining bolt 17 having threaded engagement with the link 14. By loosening this bolt and turning the disk 13ª the position of the axis of the eccentric pin 13 may be varied and thus the effective length of the link 14 is changed.

At a point between the shaft 10 and the pin 12 the lever 11 is provided with a pin 18 which turns in an opening in the lower end of a connecting rod 19 whose upper end is pivotally secured to a crank pin 20 fixed to a crank disk 21 mounted on a shaft 22. This shaft is driven by means of a simple spur gear reduction drive from an electric motor 23 which is mounted upon bracket elements 24 and 25 welded to the sections 2 and 3, respectively, of the casing. The motor 23 is of the ordinary unidirectional type so that the shaft 22 and the disk 21 with its crank pin 20 always turn in the same direction, but the motor is provided with automatic control means of any usual type (not here shown) operative to stop the motor after the crank pin 20 has moved through an arc of 180°. Such stop mechanisms are common articles of commerce and readily available.

The lever 11 and the link 14 with the connecting pin 12 constitute a toggle device, whereby the valve head may be pressed firmly against the seat 5. However, the parts are so arranged that the pressure can never become excessive. With this purpose in view the parts are so constructed and arranged that the crank pin 20 normally stops at the opposite ends of a vertical diameter V of its path of movement. Thus as the pin 20 approaches the lower end of the vertical diameter of its path of movement the toggle joint at 12 approaches dead center, that is to say, that position in which the axes of the parts 15, 12 and 10 are in the same straight line. As the pin 20 reaches the lower end of the vertical diameter of its path of movement, the toggle joint at the pin 12 just reaches dead center, the valve head firmly engaging the seat when the crank pin reaches its stopping point. Since the valve is now pressed hard against the seat and the toggle is on dead center and the connecting rod 19 is vertical, the valve head is positively locked in closed position. Accurate seating of the valve may be assured by manual adjustment of the pin 12. When the crank pin again begins to move, it breaks the toggle and carries the valve head away from its seat, the crank pin again stopping when it reaches the upper end of the vertical diameter of its path, at which time the valve is fully open. With this arrangement it is obvious that even though, through accident, the motor should continue to operate after the valve head is seated, no abnormal stress would be imposed upon the parts since the continued motion of the crank pin 20 beyond the stopping point merely breaks the toggle upwardly and again moves the valve head away from its seat. Even though the motor should continue to run uninterruptedly, the only result would be an intermittent closing and opening of the valve.

The adjustment provided by the eccentric pin 12 and the disk 13ª and bolt 17 provides for very minute adjustment of the effective length of the link 14 so as to compensate for any slight wear between the seat surfaces, wear in the various bearings, or abnormal temperature changes, such adjustment being readily accomplished without dismantling the valve and without interfering with its operation.

While one desirable embodiment of the invention has been illustrated and described by way of example, it is to be understood that the invention is not necessarily limited to this precise embodiment but is to be regarded as broadly inclusive of any and all equivalents which fall within the terms of the appended claims.

I claim:

1. In combination in a valve device having a seat and a valve head cooperable with the seat, a valve stem journaled to turn about an axis parallel to the plane of the valve seat, rigid means connecting the valve head to the stem, a rock arm fixed to the stem, a shaft having its axis parallel to that of the valve stem, a lever mounted to swing about the axis of said shaft, journal means for the valve stem and shaft, said journal means being constructed and arranged to maintain the axis of the stem and shaft at a predetermined fixed distance apart, a link connecting the free ends of the rock arm and lever, the link and lever constituting a toggle, a connecting rod having one end pivotally connected to the lever, a crank pin arranged to move in a circular path to which the other end of the link is connected, and means operative to move the crank pin intermittently always in the same direction through successive arcs each of 180°, and means operative to vary the effective length of the link.

2. In combination in a valve device having a seat and a valve head cooperable with the seat, a valve stem journaled to turn about an axis parallel to the plane of the valve seat, rigid means connecting the valve head to the stem, a rock arm fixed to the stem, a shaft having its axis parallel to that of the valve stem, a lever mounted to swing about the axis of said shaft, journal means for the valve stem and shaft, said journal means being constructed and arranged to maintain the axis of the stem and shaft at a predetermined fixed distance apart, a link connecting the free ends of the rock arm and lever, the link and lever constituting a toggle, a connecting rod having one end pivotally connected to the lever, a crank pin arranged to move in a circular path to which the other end of the connecting rod is connected, and means operative to move the crank pin intermittently always in the same direction through successive arcs each of 180°, the lever having a pin at its free end, an adjustable eccentric bushing carried by the link, the pin turning freely in the bushing, and means for fixing the bushing in such position relatively to the link that when the crank pin is at the end of one of said arcs the valve is fully seated and the toggle joint is on dead center.

EARLE F. ALLEN.